United States Patent [19]

Mitchell

[11] 3,918,508
[45] Nov. 11, 1975

[54] WHEEL RIM ASSEMBLIES
[75] Inventor: William Eric Mitchell, Coventry, England
[73] Assignee: Dunlop Limited, England
[22] Filed: Nov. 30, 1973
[21] Appl. No.: 420,596

[30] Foreign Application Priority Data
Dec. 6, 1972  United Kingdom............... 56311/72
June 30, 1973  United Kingdom............... 31288/73

[52] U.S. Cl................................. 152/381; 152/400
[51] Int. Cl.² ...................................... B60C 25/12
[58] Field of Search ........... 152/381, 379, 399, 158, 152/400, 366, 343, 344, 345, 430; 301/97, 98, 9 DN, 9 R, 8

[56] References Cited
UNITED STATES PATENTS
1,652,147  12/1927  Michelin ............................ 152/381
3,638,701  2/1972  Rossler ............................... 152/158

FOREIGN PATENTS OR APPLICATIONS
1,157,002  12/1957  France ................................ 152/381

Primary Examiner—M. Henson Wood, Jr.
Assistant Examiner—Reinhard J. Eisenzopf
Attorney, Agent, or Firm—Stevens, Davis, Miller & Mosher

[57] ABSTRACT

A wheel rim assembly comprising a rim having a well disposed between tire and bead seating portions in a position axially offset towards the outboard bead. An annular split band is provided to cover the well to define in combination with the outboard seating portion a circumferentially extending groove in which the toe of the associated bead may be located to prevent the axial inward displacement of the bead.

11 Claims, 8 Drawing Figures

WHEEL RIM ASSEMBLIES

This invention relates to improvements in wheel rim assemblies.

In the event of the sudden deflation of a pneumatic tire on a moving vehicle the beads of the tire are liable to be axially displaced from their normal bead seats and in the case of a tire mounted on a normal well base rim one or both of the beads may enter the well of the rim. In this condition, the steering control of the vehicle is severely impaired and the tire may even be dragged completely off the rim.

It is the object of this invention to provide a well base rim having a simple detachable means to prevent the axial inward displacement of at least one of the beads of a pneumatic tire into the well.

According to a first aspect of the present invention a wheel rim assembly comprises a rim having a well which is disposed between tire bead seating portions, means being provided to cover the well and define in combination with one of the bead seating portions a circumferentially extending groove in which the toe of an associated tire bead may be located to prevent the axial inward displacement of the bead.

Preferably the well may be disposed in an axially off-set position adjacent the outboard bead of an associated tire, the remainder of the rim base not forming part of the well comprising a slightly radially inwardly depressed portion.

The means to cover the well may be in the form of a circumferentially extending split band, the band acting in combination with the well to resist axial inward displacement of at least one tire band seated on a bead seating portion, the ends of the band being connected by a link deformable material having sufficient rigidity after a length shortening deformation to hold the ends of the band against circumferential displacement relative to one another in service of the assembly.

Preferably, the link is formed from a piece of stiff wire hooked at its opposite ends into slots or holes formed in the respective ends of the band. Deformation of a wire link of this kind may be achieved by applying torque to a portion spanning a gap in the ends of the band so as to product a kink in the wire. Such deformation may be carried out by the use of a slotted tool after the band and a tire have been assembled on the rim, and the slotted tool may be arranged to have a limited angular movement between the ends of the band so as to provide a kink of predetermined dimensions.

This invention also provides a wheel and a wheel and tire assembly incorporating a wheel rim assembly as defined above.

Two embodiments of the present invention will now be described by way of example with reference to FIGS. 1 to 7 of the accompanying drawings in which.

Figure 1:
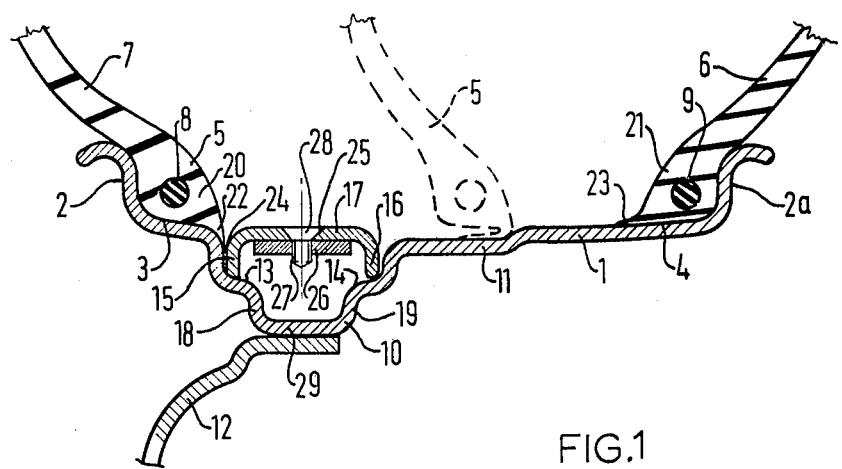
FIG. 1 is an axial cross-sectional view of part of a wheel and tire assembly, showing in dotted lines a tire bead in an axially displaced position.

As shown in FIG. 1 a wheel rim 1 comprises two annular bead retention flanges 2 and 2a and two bead seating portions 3 and 4 which support the beads 5 and 6 of an associated pneumatic tire 7, the beads being reinforced with inextensible bead wires 8 and 9. Disposed between the bead seating portions 3 and 4 is a circumferentially extending stepped well portion 10 of reduced width compared to the width of a conventional well and off-set to be adjacent the outboard bead seat 3 of the rim 1. The remainder of the rim base forming part of the well 10 comprises a slightly radially inwardly depressed portion 11 adjacent the inboard bead seating portion 4. A wheel disc 12 of a conventional type is welded to the base 29 of the well 10.

Figure 2:
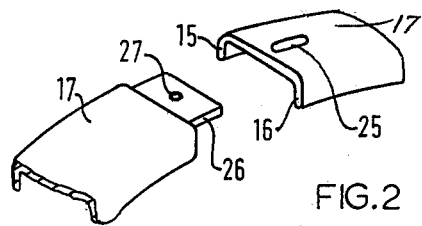
FIG. 2 is a perspective view of part of a band for covering the well of the rim in accordance with the invention.

The sides 18 and 19 of the well 10 are provided with axially extending steps or grooves 13 and 14 which extend around the periphery of the rim and are arranged to support the radially turned edges 15 and 16 of a band 17 of mild or spring steel, the band 17 being of sufficient width to cover the well 10. The steel band 17 (as shown in FIG. 2) is substantially circular and is split at one point of its circumference, one end being provided with a circumferentially extending slot 25 and the other end having a tongue portion 26 containing a screw-threaded hole 27 into which a clamping screw 28 passing through the slot of the other end is inserted to provide releasable securing means for the band.

The toes 20 and 21 of the tire bead 5 and 6 are provided with extended rubber lip portions 22 and 23, and the lip portion 22 of the outboard bead 5 is arranged to locate within a groove 24 formed by the side 18 of the well 10 and the radially inwardly turned edge 15 of the steel band 17 adjacent the outboard bead seat 3. The steel band 17 acts to prevent the outboard bead 5 being axially and radially inwardly displaced into the well 10 and the location of the bead lip 22 in the groove 24 resists axial displacement of the bead 5 across the radially outer face of the band 17.

To assemble the tire onto the rim the inboard tire bead is positioned on its associated bead seat by conventional means employing the well to enable the bead to be passed over the outboard flange 2.

The outboard bead 5 is similarly positioned on the rim and then pushed axially across the depressed portion 11 of the rim base clear of the well 10 as shown in dotted lines in FIG. 1.

The steel band 17 is loosely positioned in the well 10 with the radially inwardly turned edges 15 and 16 of the band resting against the steps 13 and 14 of the well 10. The band is pulled tight to assume the approximate diameter of tire beads 5 and 6 and the clamping screw 28 is tightened to hold the band in position.

When the band 17 is secured in position, the outboard tire bead 5 is moved back over the band 17, the lip 22 riding fairly easily over the band in this direction of movement, and the bead 5 is then positioned on its bead seat 3. The tire may then be inflated by conventional means. The lip portion 22 is located in the radially inwardly tapering groove 24 formed between the side 18 of the well 10 and the radially inwardly turned edge 15 of the band, and serves to resist axial movement of the bead 5 away from its seat.

In a second embodiment of the present invention as shown in FIGS. 3 to 8, the screw connection of FIGS. 1 and 2 is replaced by a link 40 made from stiff steel wire 3.18 millimetres (⅛ of an inch) in diameter and hooked at its end 41 and 42 through slots 43 and 44 formed respectively in a split band 45, having ends 45a, 45b, which is similar in its general form to the band 17 of FIGS. 1 and 2.

Figure 3:
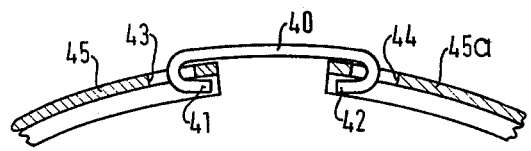
FIG. 3 is a partial cross-sectional view in the axial direction showing a modified well cover band in accordance with the present invention.
Figure 4:
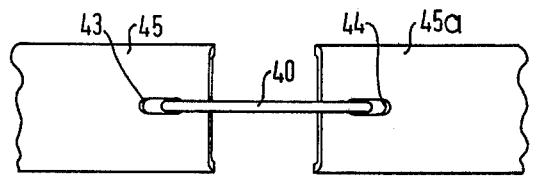
FIG. 4 is a plan view, in the radial direction looking towards the axis of the wheel, of the arrangement shown in FIG. 3.
Figure 5:
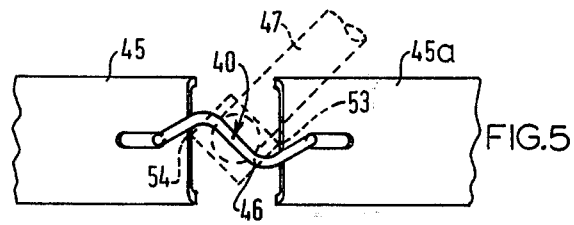
FIG. 5 is a view corresponding to FIG. 4 showing the tightened state of the band.

FIGS. 3 and 4 show the link 40 in its undeformed state, the hooked portions 41, 42 being inserted in the slots 43 and 44 to secure the band in position around a wheel rim well, but in order to hold the band 45 firmly in position the link 40 is subsequently deformed to a Z-shape incorporating a kink 46 as shown in FIG. 5. This is very easily accomplished by the use of a tool of the kind shown in FIGS. 6 and 7, which consists of an L-shaped handle 47 on which a square block 48 is formed, the block 48 having a slot 49 having a slightly greater width than the diameter of the wire forming the link 40 and having rounded ends 50.

Figure 6:
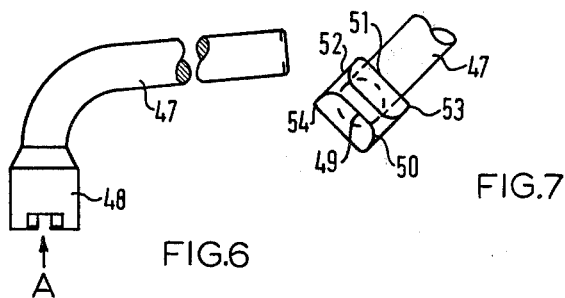
FIG. 6 is a side view of a tool for tightening the band.
Figure 7:
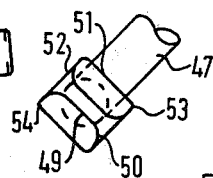
FIG. 7 is a view in the direction of the arrow A of part of the tool shown in FIG. 6.

By suitable choice of dimensions for the sides 51, 52 of the block 48 and the undeformed length of the link 40 in relation to the desired final spacing of the ends of the band 45, it is possible to arrange that when the tool shown in FIGS. 6 and 7 is engaged with the link passing through the slot 49 a handle 47 can only be turned until the outer corners 53, 54 of the tool abut the respective ends of the band as shown in dotted lines in FIG. 5. This serves to limit the angle through which the tool can be rotated and thus enables a predetermined degree of tightening of the band to be achieved.

Figure 8:
FIG. 8 is a view in the axial direction showing a part of the band.

FIG. 8 shows the part of the band 45 diametrically opposite the joint between its ends, in which a semi-circular notch 55 is formed in each of the radially inwardly turned edges 56. The notches 55 weaken the band and thus render it easier to fit to the rim. This arrangement is of course also applicable to the band 17 shown in FIGS. 1 and 2.

The fastening means described above is particularly cheap, easy to assemble and reliable both in assembly and subsequent operation.

While a simple wire link having a single kink is described above, the link may be of a metal strip material or any other suitable material. The deformation may take the form of a kink or kinks of any desired contour including part-circular arcs or closed loops or twists. Multiple kinks or crimps may be employed to shorten the length of the link in order to tension the band.

The constructions described above not only prevents the outboard tire bead from being displaced into the wall of the rim in the event of a puncture or blow-out but furthermore the engagement of the lip on the outboard tire bead into the groove of inwardly tapering cross-section formed between the band and the rim resists axial displacement of the outboard bead over the band. This retention of the outboard bead on its seat has important advantages in improving the stability of a deflated tire under cornering loads, and enables greater steering control to be maintained by the driver of a vehicle after a sudden deflation has occurred. The engagement of the lip in the groove also improves the sealing of the outboard bead against loss of inflation pressure, a factor which is particularly important when the tire is already partially deflated since in this condition its outboard bead may tend to move axially under cornering loads so as to expose the line of junction between the band and the wall of the rim well: such movement is resisted by the engagement of the lip in the groove, and the lip also maintains close contact with the wall of the rim to provide an effective seal at all times even when the bead rocks on its seat.

Having now described my invention, what I claim is:

1. A wheel rim assembly comprising a rim having a circumferential well disposed between tire bead seats, means to cover the well to define in combination with one of the bead seats a circumferentially extending groove which tapers radially inwardly and is arranged to locate a lip formed on a toe of an associated tire bead when the assembly is in use with a tire mounted thereon to prevent the axial inward displacement of the bead, the diameter of the well covering means being no greater than the minimum diameter of the bead seats so that when the well covering means is in position covering the well the associated tire bead can be moved over said well covering means, wherein the means to cover the well comprises an annular band split at one point about its circumference, the band being provided with radially inwardly turned edges which are arranged to rest on circumferentially extending step portions formed one on each side of the well.

2. A wheel rim assembly according to claim 1 wherein the well is disposed in an axially off-set position on the rim base between the bead seats of the rim, the remainder of the rim base not forming part of the well comprising a slightly radially inwardly depressed portion.

3. A wheel rim assembly according to claim 1 wherein the circumferentially extending groove arranged to locate the toe of an associated tire bead is formed by the side of the well adjacent the outboard bead of the associated tire and the adjacent radially inwardly turned edge of the band.

4. A wheel rim assembly according to claim 3 wherein the ends of the band are arranged to be connected by a link of deformable material having sufficient rigidity after a length shortening deformation to hold the ends of the band against circumferential displacement relative to one another in service on the assembly.

5. A wheel rim assembly according to claim 4 wherein the link is formed from a piece of stiff wire hooked at its opposite ends into slots or holes formed in the respective ends of the band.

6. A wheel rim assembly according to claim 5 wherein the link may be deformed by applying torque to a portion spanning a gap between the ends of the band so as to produce a kink in the wire.

7. A wheel rim assembly according to claim 1 wherein a releasable securing means is provided to hold the annular band in position around the well of the rim.

8. A wheel rim assembly according to claim 7 wherein the securing means comprises a circumferentially extending slot provided in one end of the band and a tongue portion in the other end, the tongue portion being provided with a screw-threaded hole into which a clamping screw passing through the slot of the other end may be inserted, the clamping screw being arranged to hold the two ends of the band together after the band has been tightened around the well of the rim.

9. A wheel comprising a rim according to claim 1 with a disc portion attached thereto.

10. A tire and wheel assembly incorporating a wheel rim assembly as claimed in claim 1 having a pneumatic tire mounted thereon.

11. A tire and wheel assembly according to claim 10 wherein the toes of the tire beads are provided with extending rubber lip portions, the lip portion of the outboard tire bead being arranged to locate in the circumferentially extending groove formed by the outboard side of the well and the radially inwardly turned edge of the band to prevent the axial inward displacement of the bead.

* * * * *